United States Patent [19]

Kuhn

[11] Patent Number: 4,950,907
[45] Date of Patent: Aug. 21, 1990

[54] LUMINESCENT STORAGE SCREEN AND READ-OUT APPARATUS THEREFOR

[75] Inventor: Herbert Kuhn, Hessdorf, Fed. Rep. of Germany

[73] Assignee: Siemens Aktiengesellschaft, Berlin and Munich, Fed. Rep. of Germany

[21] Appl. No.: 332,493

[22] Filed: Apr. 3, 1989

[30] Foreign Application Priority Data

Jun. 16, 1988 [DE] Fed. Rep. of Germany ....... 3820582

[51] Int. Cl.$^5$ .................... G01T 1/105; G03B 42/00
[52] U.S. Cl. ............................ 250/484.1; 250/327.2
[58] Field of Search .............. 250/327.2 D, 327.2 E, 250/327.2 F, 484.1 B

[56] References Cited

U.S. PATENT DOCUMENTS

| | | |
|---|---|---|
| 4,346,295 | 8/1982 | Tanaka et al. |
| 4,737,641 | 4/1988 | Lange et al. ............... 250/327.2 |
| 4,778,995 | 10/1988 | Kulpinski et al. ......... 250/327.2 |
| 4,818,876 | 4/1989 | Agano et al. ............... 250/484.1 |

FOREIGN PATENT DOCUMENTS

| | | |
|---|---|---|
| 0077678 | 4/1983 | European Pat. Off. |
| 0112469 | 4/1984 | European Pat. Off. |
| 0262100 | 12/1985 | Japan ........................... 250/484.1 |
| 1251800 | 11/1986 | Japan ........................... 250/484.1 |

OTHER PUBLICATIONS

Ishigaki et al., One-Shot Dual Energy Subtraction Imaging, Oct. 1986, pp. 271-273. Radiology 1986.

Primary Examiner—Constantine Hannaher
Assistant Examiner—Edward J. Glick
Attorney, Agent, or Firm—Hill, Van Santen, Steadman & Simpson

[57] ABSTRACT

A luminescent storage screen of the type used to latently store an x-ray image in an x-ray diagnostics installation has two phosphor layers separated by and carried on a carrier disposed therebetween. The carrier is substantially transparent to x-radiation, so that the x-ray image is stored in both phosphor layers. A read-out apparatus for the storage screen includes a read-out beam generator which generates a single read-out beam which is directed at one side of the storage screen. The carrier is transmissive to the read-out beam, but is impermeable to light emitted by the phosphor layers, so that the light emitted by each phosphor layer during simultaneous read-out can be separately collected and detected. The single read-out beam simultaneously scans both phosphor layers, so that the resulting images are automatically correlated. The images are then combined in a known manner to form a single, displayed image.

6 Claims, 1 Drawing Sheet

LUMINESCENT STORAGE SCREEN AND READ-OUT APPARATUS THEREFOR

BACKGROUND OF THE INVENTION

1. Field of the Invention

The present invention relates to a luminescent storage screen of the type suitable for latently storing an x-ray image in an x-ray diagnostics installation, and an apparatus for reading-out the stored image from the screen.

2. Description of the Prior Art

An x-ray diagnostics installation is described in German OS No. 35 29 306 which includes a luminescent storage screen having a photo stimulable phosphor which is irradiated by x-rays attenuated by an examination subject. The phosphor serves as a radiation-sensitive transducer in which holes (in the electronic sense) are generated, and are stored in potential traps or wells. The entire surface of this storage screen is scanned pixel-by-pixel during read-out by a different radiation source, for example a laser, so that the holes stored in the traps are excited, and then fall back into a stable energy level. The energy difference is emitted in the form of light quanta. The x-ray image latently stored in the screen can thus be read-out of the screen at a later time.

The storage screen in this known installation consists of two phosphors separated by a light-impermeable layer. These phosphor layers are scanned surface-wide by a beam deflected by a mirror, for example, in the vertical direction, with the beam being divided by a beam splitter so that both phosphor layers are simultaneously scanned. All picture elements in a line of the storage screen are successively scanned by this deflection. The entire screen surface is scanned by moving the storage screen perpendicularly relative to the line scanning, advancing the screen line-by-line. The light emitted by the stimulable phosphor layers as a result of the interaction with the read-out beam is acquired by two optical collectors, and is supplied to the light-sensitive input faces of two separate light detectors. The respective output signals of the detectors are supplied to a video chain for reproduction on a display, with the output signals of the two detectors being combined.

Instead of dividing the read-out beam, however, it is also possible to use two separate radiation generators, each undertaking a separate scanning of one of the phosphor layers. In this case, however, it is necessary to synchronize the deflection of both scan beams, so that the picture elements of the two phosphor layers which correspond to each other are simultaneously read-out. Synchronization need not be undertaken at the time of read-out; it can alternatively be undertaken electronically in a processing circuit following the light detectors.

The two storage layers in combination function as a single storage layer having an increased thickness. It is known that the efficiency of a phosphor layer increases with increasing thickness, since more x-ray radiation is absorbed in a thicker layer. Image sharpness, however, decreases with increasing layer thickness, so that fine details of the image can no longer be adequately portrayed. By using two separate phosphor layers, with a separate read-out of each layer, the efficiency of a layer having a thickness corresponding substantially to the combined thickness of the two layers is achieved, while a better image sharpness is obtained than would be possible using a single layer of the same combined thickness. A disadvantage is the complexity of the read-out system which is required for such a screen, which not only requires two separate read-out beams, but also structure for guiding and synchronizing the two beams so that the pixels separately read-out from each phosphor layer can be correlated to form a single image. Two synchronized scan systems, or at least two synchronized scan beams, are required.

Another x-ray diagnostics installation is described in OS No. 29 51 501 which includes a luminescent storage screen having a phosphor layer scanned by a read-out beam, with detectors being disposed on both sides of the storage screen. These detectors respectively collect the light emitted from the phosphor layer in an upward direction and the light emitted in a downward direction. A higher light yield and thus an improved bright-dark contrast are thereby achieved. Because only a single phosphor layer is used, however, the competing problems of efficiency of x-ray radiation absorption and image sharpness are still present.

SUMMARY OF THE INVENTION

It is an object of the present invention to provide a storage luminescent screen for use in an x-ray diagnostics installation having two separated phosphor layers, each of which contains a latently stored x-ray image, which permits a simple read-out of both phosphor layers with pixel correlation between the two read-out images.

The above object is achieved in accordance with the principles of the present invention in a storage screen wherein the two phosphor layers are separated, and carried on, a carrier sandwiched therebetween which is transmissive for the read-out radiation, but is opaque for the light emitted by each of the phosphor layers. A single read-out beam is used in a read-out apparatus constructed in accordance with the principles of the present invention which scans the storage screen from one side only. It is thus not necessary to split the read-out beam, and thereafter to synchronize the scanning conducted by the split beams, as in conventional devices, nor is it necessary to synchronize the deflection of two separate read-out beams, as in other prior art devices. Nonetheless, the resolution is enhanced because the emitted light of the respective phosphor layers does not influence the light of the other layer, so that the light respectively emitted by each layer can be separately collected and detected.

The invention described herein proceeds from the recognition that the image quality in a planar receiver is essentially defined by the signal-to-noise ratio. This noise, which is predominantly quantum noise given high-sensitivity systems, is diminished with an increasing number of absorbed x-ray quanta, i.e., when the effective layer thickness is increased. The sensitivity of such a system thereby becomes greater, so that a reduction of the patient radiation dose can be undertaken. The necessary image sharpness is preserved by dividing the transducer layer into two phosphor layers which are separately scanned. The simultaneous scanning of both phosphor layers by a single scan beam synchronizes the two scanning in a simple manner, so that both signal values which are read-out exactly coincide in terms of picture elements.

A separate light collector and light detector are provided for each phosphor layer, so that both phosphor layers can be simultaneously read-out. Exposures having different resolution can be achieved by varying the relative thicknesses of the two phosphor layers, such as by making the first phosphor layer, i.e., the layer closer to the x-ray source and closer to the scan beam source, thinner than the second phosphor layer facing away from such radiation sources.

DESCRIPTION OF THE PREFERRED EMBODIMENTS

Figure 1:
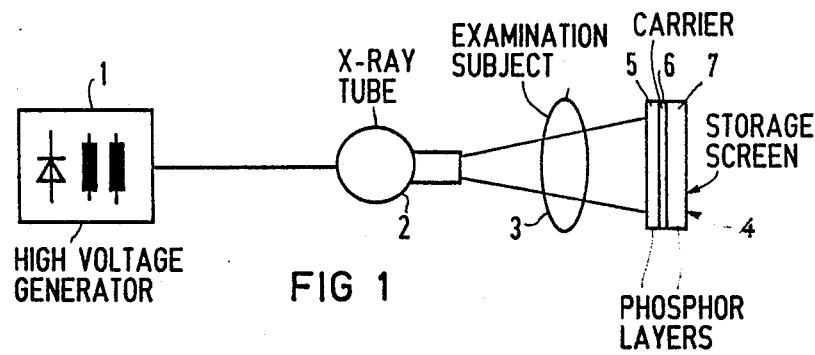
FIG. 1 is a schematic block diagram of an x-ray diagnostics installation including a luminescent storage screen constructed in accordance with the principles of the present invention.

An x-ray installation is shown in FIG. 1 which includes a high voltage generator 1 which feeds an x-ray tube 2, which emits x-rays which penetrate an examination subject 3. The x-rays attenuated by the subject 3 are incident on a luminescent storage screen 4. As described above, the radiation incident on the screen 4 generates holes which are stored in potential traps of the stimulable phosphor, so that a latent image is stored in the screen 4.

The luminescent storage screen 4 consists of a first phosphor (storage) layer 5 which is separated from a second phosphor (storage) layer 7 by a carrier 6 disposed therebetween. The first phosphor layer 5 facing toward the x-ray tube 2 may be thinner than the second storage layer 7. The carrier 6 does not attenuate the x-ray radiation, or attenuates the x-ray radiation only to an insignificant degree.

Figure 2:
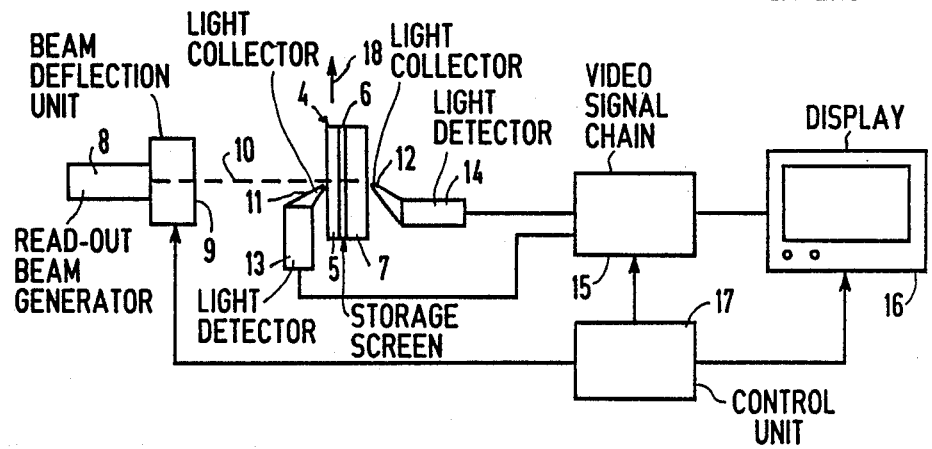
FIG. 2 is a schematic block diagram of a read-out apparatus constructed in accordance with the principles of the present invention for the luminescent storage screen of FIG. 1.

An apparatus for reading-out the images stored in the phosphor layers 5 and 7 is shown in FIG. 2. The apparatus includes a single read-out beam generator 8, for example a laser, which generates a single scan or a read-out radiation beam 10. The scan beam 10 is deflected line-by-line across the storage screen 4 by a beam deflection unit 9, which may consist of a deflecting mirror for vertical deflection. For horizontal deflection, the storage screen 4 is displaced along the arrow 18. The read-out beam 10 excites the stimulable phosphor in the first storage layer 5 pixel-by-pixel along each line. The carrier 6 is transmissive to the read-out radiation, so that the same beam 10 penetrates the carrier 6 and excites the identically corresponding picture element in the phosphor layer 7. The carrier 6 is opaque to the light emitted by the phosphor layers 5 and 7. The phosphor layers 5 and 7 may respectively emit light of different wavelengths, in which case the carrier 6 is opaque to both wavelengths of light. As a result, the light from the first phosphor layer 5 can only be acquired by a first light collector 11, which supplies the light from the phosphor layer 5 to a first light detector 13. The light emitted by the second storage layer 7 is acquired only by a second light collector 12, and is supplied to a second detector 14.

The light detectors 13 and 14 measure the brightness of the scanned picture elements and convert this measured value into electrical signals in a known manner, which are supplied to a video signal chain 15. The video signal chain 15 combines the analog output signals of the detectors 13 and 14 in a known manner, and converts the combined result into a video signal for portrayal on a display 16.

During display, a control unit 17 synchronizes operation of the deflection unit 9, the video signal chain 15 and monitor 16. The video signal chain 15 includes image memories, a processing circuit, and suitable transducers arranged in a known manner.

In an exemplary embodiment, the read-out beam generator may be a He-Ne laser which generates a read-out beam at a wavelength of 633 nm. The phosphor comprising the layer 5 and 7 may be a BaFBr phosphor, so that the wavelength maximum of the emitted light is approximately 400 nm. The laser light is permitted to pass by using an optical filter, for example Kodak Wratten No. 8, in the carrier 6, this optical filter being opaque to the emitted light from the phosphor layers. Simultaneous stimulation of both storage layers 5 and 7 by the same scan beam 10 automatically yields a pixel-exact coincidence of the read-out signal values for each storage layer 5 and 7. The addition of the registered signal values in the video chain 15 results in an image wherein the signals have approximately two times the amplitude as given a signal layer, whereas disturbing noise rises only by a factor $\sqrt{2}$. The resulting image thus exhibits improved image quality with the same patient radiation dose.

As shown, the two storage layers 5 and 7 can have different thicknesses. Due to the x-ray absorption in the first phosphor layer 5, it is preferable to have the second layer 7 thicker than the first layer 5.

It is also possible to use a luminescent storage screen 4 of the type described herein in a scanner which can only read-out one layer, i.e., a scanner having only one detector. If the layers 5 and 7 of the screen 4 have significantly different thicknesses then the image of the thin, first storage layer 5 will exhibit a better resolution than that of the thick, second storage layer 7. Such a luminescent storage screen 4 can then be employed both as a fine-recording system or detector as well as a highly-sensitive system or detector, depending upon which of the two storage layers 5 or 7 is selected for read-out in the scanner. For this purpose, it is necessary that the storage screen be situated in the cassette during an x-ray exposure so that the storage layer which is later intended to be read-out functions as the front layer. Uniform luminescent screens 4 can thereby be used in a radiography department, which can be used optionally as a fine-recording system or detector, a highly-sensitive system or detector, or a double-layer system or detector, as needed.

Although modifications and changes may be suggested by those skilled in the art, it is the intention of the inventor to embody within the patent warranted hereon all changes and modifications as reasonably and properly come within the scope of his contribution to the art.

I claim as my invention:

1. A luminescent storage screen for latently storing an x-ray image of an examination subject and a read-out system for said screen comprising:

said storage screen consisting of a first storage layer and a second storage layer with a carrier disposed therebetween, each storage layer being responsive to stimulating radiation to luminesce and generate light corresponding to the image stored therein, said carrier being transmissive for x-ray radiation, transmissive for stimulating radiation, and opaque to the light generated by said storage layers; and said read-out system consisting of a single means for generating a single read-out beam consisting of said stimulating radiation, means for deflecting said beam surface-wide, line-by-line over said screen from only one side of said screen to simultaneously cause luminescing of each storage layer, means for collecting and detecting light from a selected one of said storage layers and generating electrical signals corresponding thereto, and means for generating a visual image from said electrical signals.

2. The combination of claim 1, wherein said read-out means further consists of an additional means for collecting and detecting light from the other of said storage layers and generating electrically signals corresponding thereto, and wherein said means for generating a visual image includes means for combining the electrical signals corresponding to the light from each of said storage layers into a single visual image.

3. The combination of claim 1 wherein one of said storage layers is thinner than the other of said storage layers, and wherein said storage screen is oriented during recording of said latent images with said thinner one of said layers closer to a source of said x-ray radiation, and is also oriented during read-out of latent images with said thinner one of said storage layers closer to said means for generating a read-out beam.

4. A luminescent storage screen for latently storing an x-ray image of an examination subject and a read-out system for said screen comprising:

said storage screen consisting of a first storage layer and a second storage layer with a carrier disposed therebetween, each storage layer being responsive to stimulating radiation to luminesce and generate light corresponding to the image stored therein, said carrier being transmissive for x-ray radiation transmissive for stimulating radiation, and opaque to the light generated by said storage layers; and said read-out system consisting of a single means for generating a single read-out beam consisting of said stimulating radiation, means for deflecting said beam surface-wide, line-by-line of said screen from only one side of said screen to simultaneously cause luminescing of each storage layer, first means for collecting and detecting light only from said first storage layer and generating electrical signals corresponding thereto, second means for collecting and detecting light from only said second storage layer and generating electrical signals corresponding thereto, and means for combining said electrical signals from said first and second means and for generating a visual image from the combined electrical signals.

5. A luminescent storage screen for use in storing a latent image generated by x-ray radiation comprising:

first and second phosphor storage layers, each phosphor to x-radiation to retain an x-ray radiation image in said layer, and responsive to stimulating radiation to luminesce to emit light corresponding to the latent image stored therein; and a carrier disposed between said first and second phosphor storage layers, said carrier being transmissive for x-ray radiation, transmissive for said stimulating radiation, and opaque to the light emitted by said phosphor storage layers.

6. A luminescent storage screen as claimed in claim 5, wherein one of said phosphor storage layers is thinner than the other of said phosphor storage layers.

* * * * *